United States Patent [19]

Wood

[11] 4,102,440

[45] Jul. 25, 1978

[54] CAM OPERATED DISC BRAKE

[75] Inventor: William H. Wood, Reseda, Calif.

[73] Assignee: Airheart Products, Inc., Chatsworth, Calif.

[21] Appl. No.: 786,131

[22] Filed: Apr. 11, 1977

[51] Int. Cl.² ............................................. F16F 55/08
[52] U.S. Cl. .................................. 188/72.7; 188/73.1; 188/73.3
[58] Field of Search .................... 188/72.4, 72.7, 72.8, 188/72.9, 73.3, 73.1

[56] References Cited

U.S. PATENT DOCUMENTS

| | | | |
|---|---|---|---|
| 3,024,873 | 3/1962 | Wilkinson | 188/72.8 |
| 3,358,793 | 12/1967 | Hollnagel et al. | 188/73.3 |
| 3,616,875 | 11/1971 | Lottridge | 188/73.3 |
| 3,765,511 | 10/1973 | Toyomasu | 188/72.7 |
| 3,878,921 | 4/1975 | Kibler et al. | 188/72.7 |
| 3,997,033 | 12/1976 | Bulmer | 188/72.7 |
| 4,002,226 | 1/1977 | Rainbolt et al. | 188/73.3 |

FOREIGN PATENT DOCUMENTS 2,313,693  10/1974  Fed. Rep. of Germany ...... 188/72.4

Primary Examiner—Trygve M. Blix
Assistant Examiner—Edward R. Kazenske
Attorney, Agent, or Firm—William W. Haefliger

[57] ABSTRACT

A disc brake assembly comprising a frame including a caliper and brake pads carried thereby in laterally spaced relation to receive a disc therebetween. An actuator including first and second plunger members located for relative lateral displacement to effect displacement of the pads relatively toward one another, thereby to brake the disc and a lever extending between the plunger members with one of the members having a convex nose received in a first wedging bearing formed in the lever. The lever being pivotably mounted about a pivot on the frame for wedging movement between the members to shift and effect relative displacement of the members to brake the disc.

10 Claims, 7 Drawing Figures

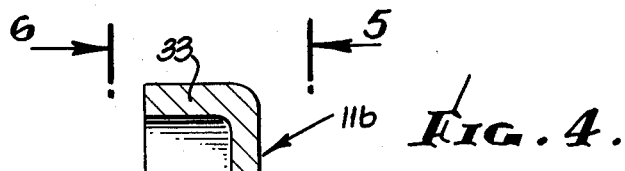
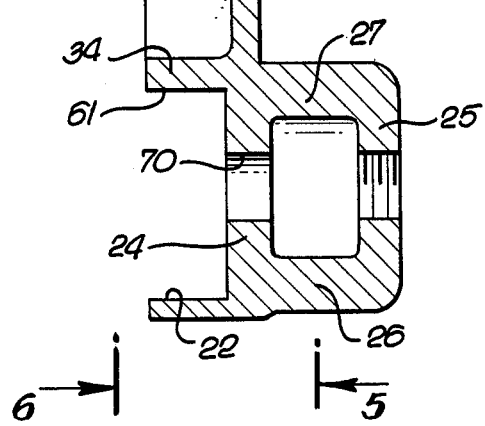
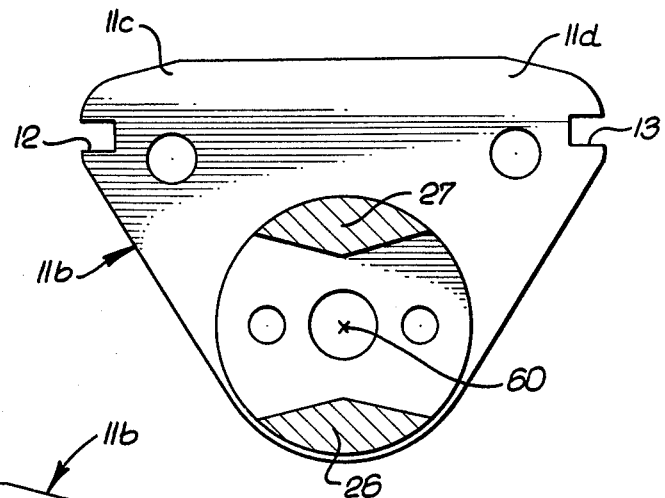
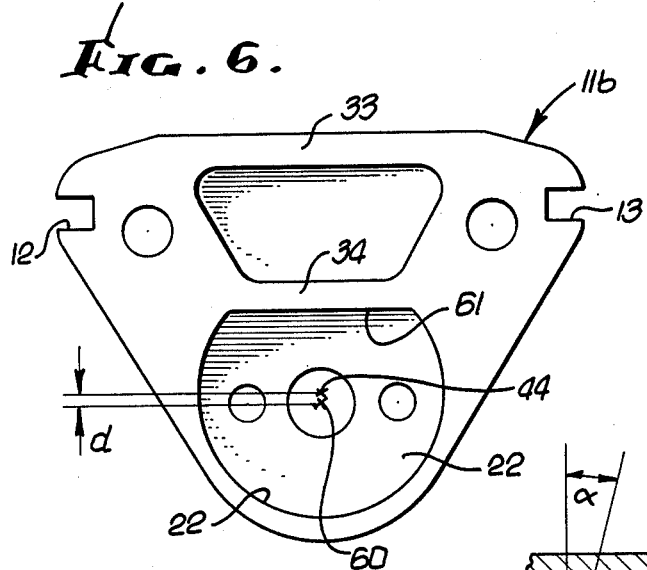
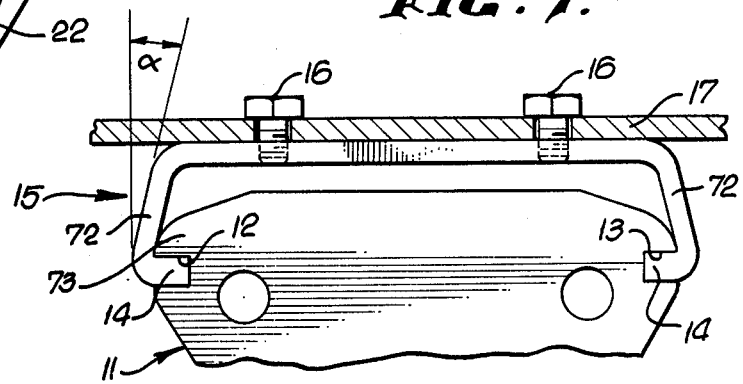

CAM OPERATED DISC BRAKE

BACKGROUND OF THE INVENTION

This invention relates generally to brakes, and more particularly concerns disc brakes characterized by extreme simplicity, compactness, and high strength.

While many and varied disc brakes have been proposed and constructed in the past, none of which I am aware possess the unusual advantages in construction, mode of operation and results as are now afforded by the present invention. These include simple, mechanical actuation; simple adjustment for brake pad wear; self-adjustment relative to the rotating disc as by tongue and groove sliding interfit as being a channel shaped mount and caliper stiffening portion of the brake frame; integration in a simple manner as between two frame parts which define a caliper to carry the pads, a sub-section stiffener for the caliper, and a hollow sub-section to receive plungers and a lever.

SUMMARY OF THE INVENTION

The invention is basically embodied in the following combination:

(a) a frame including a caliper, and brake pads carried thereby in laterally spaced relation to receive a disc therebetween, (b) first and second members located for relative lateral displacement to effect displacement of the pads relatively toward one another, thereby to brake the disc, (c) a part extending between said members, one of the members comprising a plunger having a convex nose received in a first concave bearing formed by said part, and (d) means on the frame supporting said part for wedging movement between said members tending to shift said bearing for effecting said relative displacement of the members to brake the disc.

As will appear, one or both members may be defined by plungers each of which has a convex nose received in and against a concave bearing. The two bearings may be defined by a lever pivoted to the frame so as to wedgingly displace one plunger axially relative to the other so as to effect braking; further, the plunger furthest from the pads may be adjustable in a very simple manner so as to shift the lever and other plunger toward the pads, thereby to compensate for pad wear.

The frame also has the simple, rugged, high strength, compact construction as referred to above. Also, a simple, channel-shaped frame mount is provided.

These and other objects and advantages of the invention, as well as the details of an illustrative embodiment will be more fully understood from the following description and drawings, in which:

DRAWING DESCRIPTION

FIG. 4 is a side elevation, taken in section, of a portion of the frame as seen in FIG. 1;

FIG. 5 is an end elevation on lines 5—5 of FIG. 4;

FIG. 6 is an end elevation on lines 6—6 of FIG. 4; and

FIG. 7 is a fragmentary end elevation showing mounting of the brake of FIGS. 1-6.

DETAILED DESCRIPTION

Figure 1:
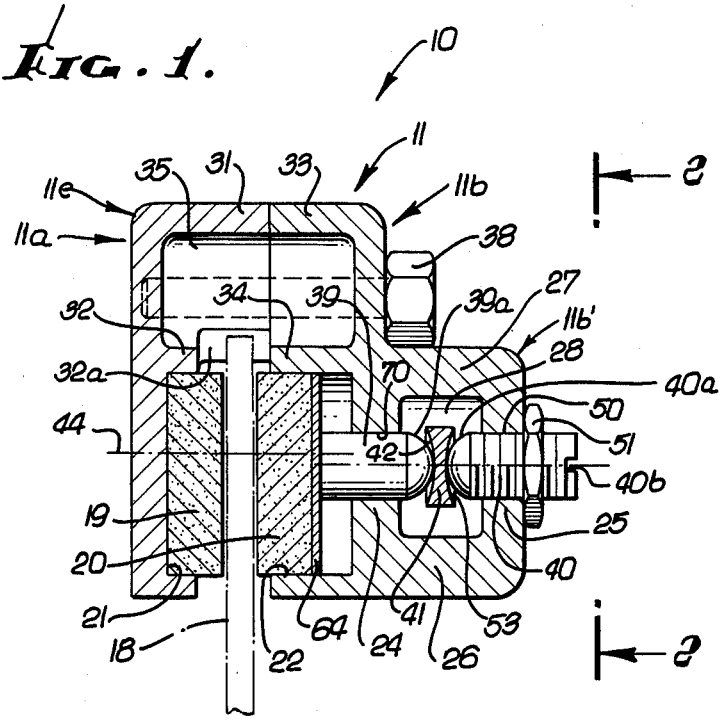
FIG. 1 is a side elevation, taken in section, showing one preferred embodiment of the brake.
Figure 2:
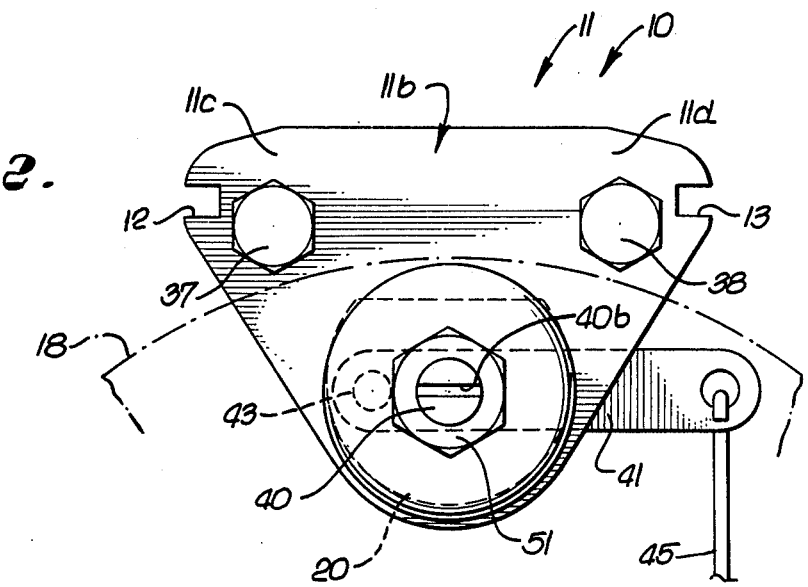
FIG. 2 is an end view on lines 2—3 of FIG. 1.
Figure 3:
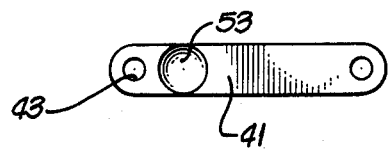
FIG. 3 is a side elevation showing the actuating lever which is also seen in FIGS. 1 and 2.

The disc brake assembly 10 of FIGS. 1 and 2 includes a frame 11 consisting of complementary sections 11a and 11b. In end elevation the sections have inverse delta outline configuration, the upper widest apart portions 11c and 11d defining horizontally parallel slots 12 and 13. The latter are laterally spaced apart and extend lengthwise transversely to slidably and loosely receive transversely extending guides formed by a mount. The guides may advantageously be defined by inwardly extending tangs 14 on the channel shaped mount 15, as seen in FIG. 7. After the mount is suitably attached to support structure, as indicated by bolts 16 attached to plate 17, the frame is guided to slide transversely relative to a rotating disc 18, whereby brake pads may adjust to engage opposite sides of the disc. As shown in FIG. 1, the laterally spaced pads 19 and 20 are carried by the lower caliper portion of the frame sections 11a and 11b. That caliper portion is further identified as defining the recesses 21 and 22 in which the pads are received.

The frame also includes a first hollow sub-section 11b' formed by section 11b and located laterally of the caliper portion as referred to. Sub-section 11b' is typically rectangular and includes walls 24-27 as shown, and defining an interior hollow or chamber 28. The frame also includes a second hollow sub-section located in upwardly offset relation to a lateral horizontal axis 44, as shown, to stiffen the lower caliper portion. In this regard, note walls 31 and 32 of section 11a projecting toward and endwise abutting walls 33 and 34 of section 11b, thereby to form sub-section 11e with interior hollow 35. Wall 32 is notched at 32a to pass the tip portion of disc 18. Accordingly, a lightweight, stiff, compact, heavy duty frame is provided. Sections 11a and 11b may be attached as by parallel, transverse, through bolts 37 and 38.

In accordance with an important aspect of the invention, first and second members are located for relative lateral displacement to effect displacement of the pads 19 and 20 relatively toward one another, thereby to brake the disc. In the example, such members may take the form as indicated at 39 and 40. One of the members, such as memeber 39 for example, may comprise a plunger having a convex nose 39a. The latter is received in a first concave bearing 42 formed by a part 41 extending between the members 39 and 40, whereby the part 41 is movable between these two members to shift the bearing 42 for effecting relative displacement of the member and consequent braking of the disc. Part 41 may advantageously comprise a lever supported by means on the frame, as for example a pivot 43 offset from a lateral axis 44 defined by plunger. Pivot 43 defines the lever fulcrum, and force may be applied to the lever, as by link 45 at the opposite side of axis 44, and with mechanical advantage, to displace the bearing 42 with consequent wedging movement and action, as described. Pivot 43 also allows movement of the lever bearing toward the pads, as will be further referred to in connection with compensation for pad wear.

The other member 40 may also, with advantage, define a second and laterally extending plunger, as shown. It may be adjustable toward (and away) from the lever to compensate for brake pad wear, and may have threaded interfit at 50 with the wall 25. Thus, when lock nut 51 on the plunger 40 is loosened to disengage wall 25, the plunger may be rotated as by a tool interfitting end slot 40b, to advance the plunger 40 toward plunger 39, i.e. deflecting the lever and plunger 39 to advance pad relatively toward disc 18. At the same time, the frame 11 may freely shift transversely on the guide tangs 14. Thereafter, nut 51 may be tightened against wall 25. The nose 40a of the second plunger 40 may also be convex and received in a second concave bearing 53 formed by the part of lever 41, axially oppositely from bearing 42. As a result, when the lever is pivoted, the two bearing surfaces 42 and 53 cooperate to increase the travel of the plunger 39, and decrease the necessary lever pivoting. Also, due to the bearing and nose relationships, less friction is developed. Further, plunger 39 may rotate slightly about axis 44, as accommodated by annular bearing 70 in wall 24, in response to lever actuation, whereby different portions of the nose are exposed to wear, extending nose life.

In this regard, the convex nose 39a has circular cross sections in planes normal to axis 44, and such planes have circular cross sections with the concave bearing 42, when that bearing and the plunger extend coaxially; similarly, the convex nose 40a has circular cross sections in planes normal to axis 44, and such planes have circular cross sections with the concave bearing 53 when that bearing and the plunger 40 extend coaxially.

Note in FIG. 6 that the pads 19 and 20 have peripheral circular segment configuration, with centers 60 offset by dimension "d" from the axis 44. For example, recess 22 to closely receive pad 20 has a chordal flat 61, which interrupts the circular configuration (with center at 60) of that recess. Accordingly, the pads do not tend to rotate when engaging the rotating disc 18. Metal plate 64 fits loosely in the recess 22.

Note in FIG. 7 that the arms 72 of mount 15 are angled with upward taper α to block upward riding of the frame ears 73, whereby clearance remains at 74 between the top of the frame and the mount. Greater strength is also thereby provided.

I claim:

1. In a disc brake assembly, the combination comprising
    (a) a frame including a caliper, and brake pads carried thereby in laterally spaced relation to receive a disc therebetween,
    (b) first and second members located for relative lateral displacement of effect displacement of the pads relatively toward one another, thereby to brake the disc, there being a lateral axis,
    (c) a part in the form of a lever extending between said members, one of the members comprising an elongated plunger having a convex nose received in a first wedging bearing formed by said part, said bearing defining a concave recess in said part, the recess being dish shaped,
    (d) means on the frame supporting said part for wedging movement between said members tending to shift said bearing for effecting said relative displacement of the members to brake the disc, said supporting means including a pivot for said lever offset from said axis, the pivot carried by the frame, and
    (e) said frame including a first hollow section located laterally of the caliper to receive said part and said plunger nose and a second section located in offset relation to said axis to be intersected by planes passing through said pads and perpendicular to said axis, said second section acting to stiffen said caliper, said frame defining a wall through which said plunger projects, the plunger being cylindrical to define said axis centrally intersecting said nose and recess, the plunger and its nose being freely rotatable about said axis, there being a bearing at said wall supporting the plunger for rotation thereof, the frame and the pad closest to said plunger defining flats which interfit to operatively block rotation of said pad relative to the frame.

2. The combination of claim 1 wherein said convex nose has a cross sectional surface defining a circle at its intersection with a plane normal to said axis.

3. The combination of claim 2 wherein said concave recess has a cross sectional surface defining a circle at its intersection with a plane normal to said axis.

4. The combination of claim 1 wherein said plunger defined by said one member is located between said part and one of said pads, the other member defining a second laterally extending plunger adjustable toward and away from said part, laterally.

5. The combination of claim 4 including structure to lock said second plunger in a selected position of adjustment, laterally.

6. The combination of claim 5 wherein said second plunger has a convex nose received in a second wedging bearing formed by said part.

7. The combination of claim 6 wherein the second plunger nose has a cross sectional surface defining a circle at its intersection with a plane normal to said axis.

8. The combination of claim 7 wherein said second bearing is concave and has a cross-sectional surface defining a circle at its intersection with a plane normal to said axis.

9. The combination of claim 8 including parallel slots on the second section, said slots being laterally spaced and extending transversely to slidably receive transversely extending guides formed by a mount.

10. The combination of claim 9 wherein the mount is channel-shaped and is of one-piece construction.

* * * * *